United States Patent
Cyr et al.

(10) Patent No.: US 6,234,566 B1
(45) Date of Patent: May 22, 2001

(54) DRIVE SYSTEM FOR EXTENDABLE ROOMS ON RECREATIONAL VEHICLES

(75) Inventors: Jean-Paul Cyr; Normand Lessard, both of Quebec (CA)

(73) Assignee: Prevost Car, Inc. (CA)

( * ) Notice: Subject to any disclaimer, the term of this patent is extended or adjusted under 35 U.S.C. 154(b) by 0 days.

(21) Appl. No.: 09/357,590

(22) Filed: Jul. 20, 1999

(51) Int. Cl.$^7$ .................................................. B60R 15/00
(52) U.S. Cl. .................... 296/171; 296/165; 296/26.13; 296/175; 296/26.09
(58) Field of Search ............................. 296/26.08, 26.09, 296/26.12, 26.13, 165, 171, 172, 175, 176; 52/67

(56) References Cited

U.S. PATENT DOCUMENTS

| | | | |
|---|---|---|---|
| 2,306,084 | * 12/1942 | Rollo | 296/171 |
| 2,965,412 | * 12/1960 | Henderson et al. | 296/171 |
| 3,915,492 | * 10/1975 | Agnese | 296/26.09 |
| 4,955,661 | * 9/1990 | Mattice | 296/171 |
| 5,237,782 | 8/1993 | Cooper . | |
| 5,248,180 | * 9/1993 | Hussaini | 296/165 |
| 5,333,420 | 8/1994 | Eden . | |
| 5,491,933 | * 2/1996 | Miller et al. | 296/26.13 |
| 5,570,924 | * 11/1996 | Few et al. | 296/26.13 |
| 5,577,351 | 11/1996 | Dewald, Jr. et al. . | |
| 5,634,683 | * 6/1997 | Ypung | 296/165 |
| 5,758,918 | * 6/1998 | Schneider et al. | 296/171 |
| 5,785,373 | 7/1998 | Futrell et al. . | |
| 5,788,306 | * 8/1998 | DiBiagio et al. | 296/165 |
| 5,791,715 | * 8/1998 | Nebel | 296/171 |
| 5,857,733 | * 1/1999 | Dewald, Jr. et al. | 296/171 |
| 5,902,001 | * 5/1999 | Schneider | 296/171 |
| 5,915,774 | * 6/1999 | Tiedge | 296/175 |
| 5,984,396 | * 11/1999 | Schneider | 296/165 |
| 6,048,016 | * 4/2000 | Futrell et al. | 296/26.13 |

\* cited by examiner

*Primary Examiner*—Joseph D. Pape
*Assistant Examiner*—Kiran B. Patel
(74) *Attorney, Agent, or Firm*—Reed Smith LLP

(57) ABSTRACT

The present invention relates to a synchronized rack and pinion system for extendable rooms for recreational vehicles. In particular, the invention provides a drive system for use in extending and retracting an extendable room on a vehicle frame. The drive system includes at least one pair of parallel rack and pinion systems operatively connected between the vehicle frame and the extendable room, with each pair of parallel rack and pinion systems synchronized through respective drive shafts. The system is operable between a closed position where the extendable room is retracted with respect to the vehicle frame and an open position where the extendable room is extended with respect to the vehicle frame.

8 Claims, 4 Drawing Sheets

DRIVE SYSTEM FOR EXTENDABLE ROOMS ON RECREATIONAL VEHICLES

The present invention relates to a synchronized rack and pinion system for extendable rooms for recreational vehicles.

BACKGROUND OF THE INVENTION

In the luxury motor home and recreational vehicle (RV) industry, there has been an increasing demand for motor homes or RV's having increased floor space and functions. In particular, luxury motor homes have seen the development of extendable or extendable rooms which enable the vehicle to comply with highway size restrictions when driving but which can be extended from the vehicle when parked in order to provide an increased amount of floor space to the occupants.

In the past, a variety of different mechanisms have been implemented in order to permit the extension and retraction of a extendable room including manual, hydraulic, mechanical screw systems and rack and gear systems.

With particular reference to rack and gear systems, various problems may exist, particularly in the extension and retraction of larger extendable rooms and the automation of that process. That is, in order to facilitate the extension and retraction of the extendable rooms, there has been a need for an efficient and effective drive mechanism which allows the room to be extended, supported, and retracted under automatic control.

In the past, examples of drive mechanisms for extendable rooms include those which are disclosed in various US patents including U.S. Pat. No. 5,577,351 which describes a extendable room which utilizes a camming linkage that allows an extendable room to be raised and lowered at its point of maximum extension to provide a floor which is flush with the main floor of the RV; U.S. Pat. No. 5,785,373 which describes a slide out room with a skid pad; U.S. Pat. No. 5,857,733 which describes a synchronization device for an extendable room utilizing a crossed rack and pinion system; U.S. Pat. No. 5,237,782 which describes an extendable room utilizing a worm gear mechanism and U.S. Pat. No. 5,333,420 which utilizes a single rack and gear drive mechanism.

None of these patents propose a system which addresses the problem of synchronized extension and retraction of both sides of a extendable room with a drive mechanism which ensures that the entire room can be extended and retracted uniformly.

SUMMARY OF THE INVENTION

In accordance with the invention, there is provided a drive system for use in extending and retracting an extendable room on a vehicle frame, the drive system comprising at least one pair of parallel rack and pinion systems operatively connected between the vehicle frame and the extendable room, each pair of parallel rack and pinion systems synchronized through respective drive shafts and operable between a closed position where the extendable room is retracted with respect to the vehicle frame and an open position where the extendable room is extended with respect to the vehicle frame.

In a more specific embodiment, the drive system includes 2 parallel pairs of rack and pinion systems where each pair of rack and pinion systems are operatively connected to one another through a second drive shaft.

In further embodiments, the rack and pinion pairs are attached adjacent the top or bottom corners of the extendable room and each drive shaft are secured to the extendable room by a drive shaft support. Respective drive shafts are preferably attached to one another through gear boxes and includes a motor for actuation. The rack and pinion system may also be load bearing.

DESCRIPTION OF THE DRAWINGS

These and other features of the invention will be more apparent from the following description in which reference is made to the appended drawings wherein.

DETAILED DESCRIPTION OF THE INVENTION

Figure 1:
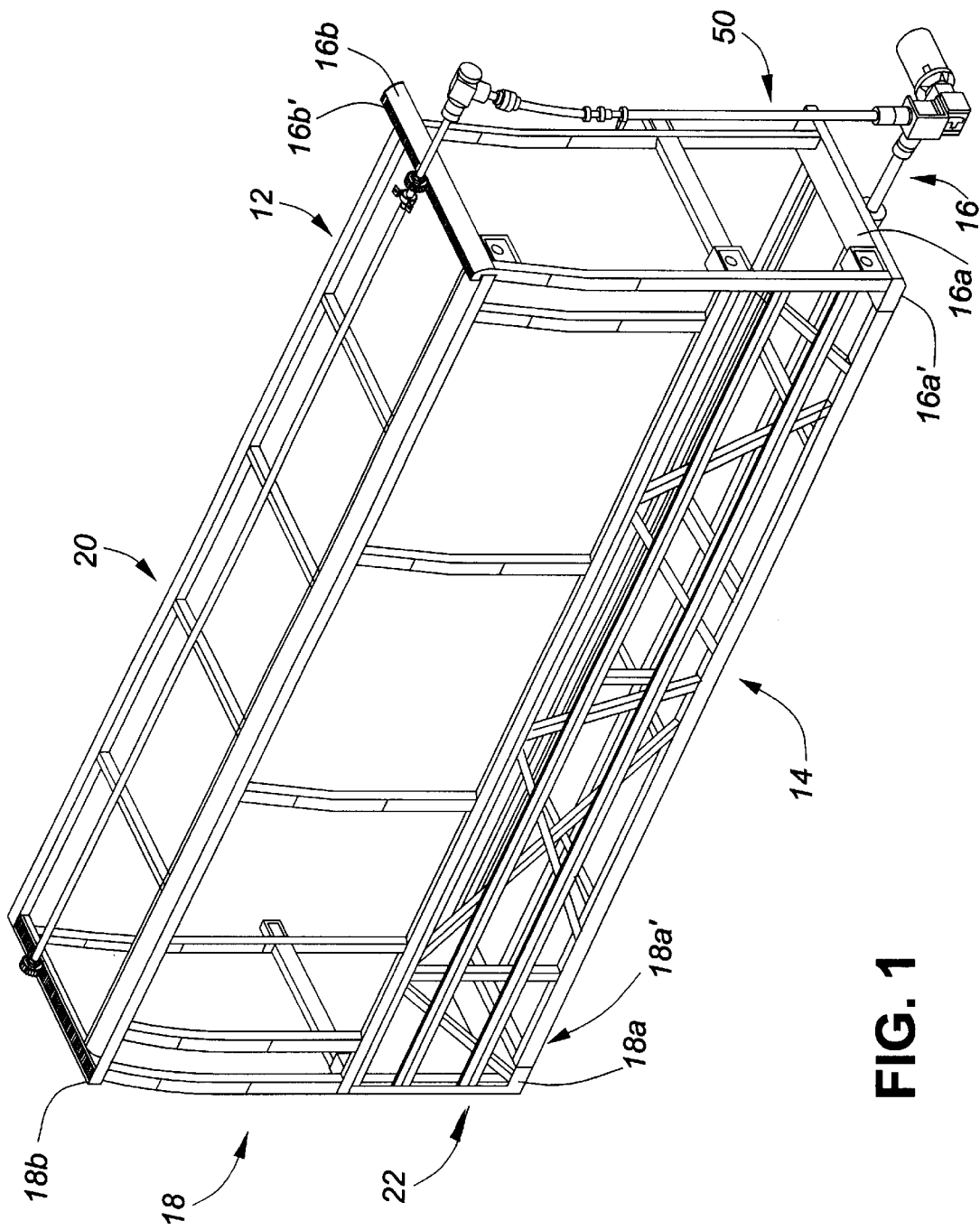
FIG. 1 is a perspective view of the frame of a extendable room and the synchronized drive system in accordance with the invention.

With reference to FIG. 1, the support and drive system for an extendable room 12 is shown. The room 12 includes appropriate structural members defining the bottom 14, sides 16 and 18, top 20 and front 22 of the room and is constructed from appropriate structural members as is understood by those skilled in the art. With particular reference to the upper and lower corner edges of the extendable room 12, corner members 16a, 16b, 18a and 18b are a component of the frame of the extendable room for support of and interaction with a drive system 50 enabling the room to be extended and retracted from the main vehicle body.

The drive system 50 includes a rack and pinion system operatively connected to each of the corner members 16a, 16b, 18a and 18b to provide uniform extension and retraction of the extendable room and support of the room within the main vehicle body (not shown).

Figure 2:
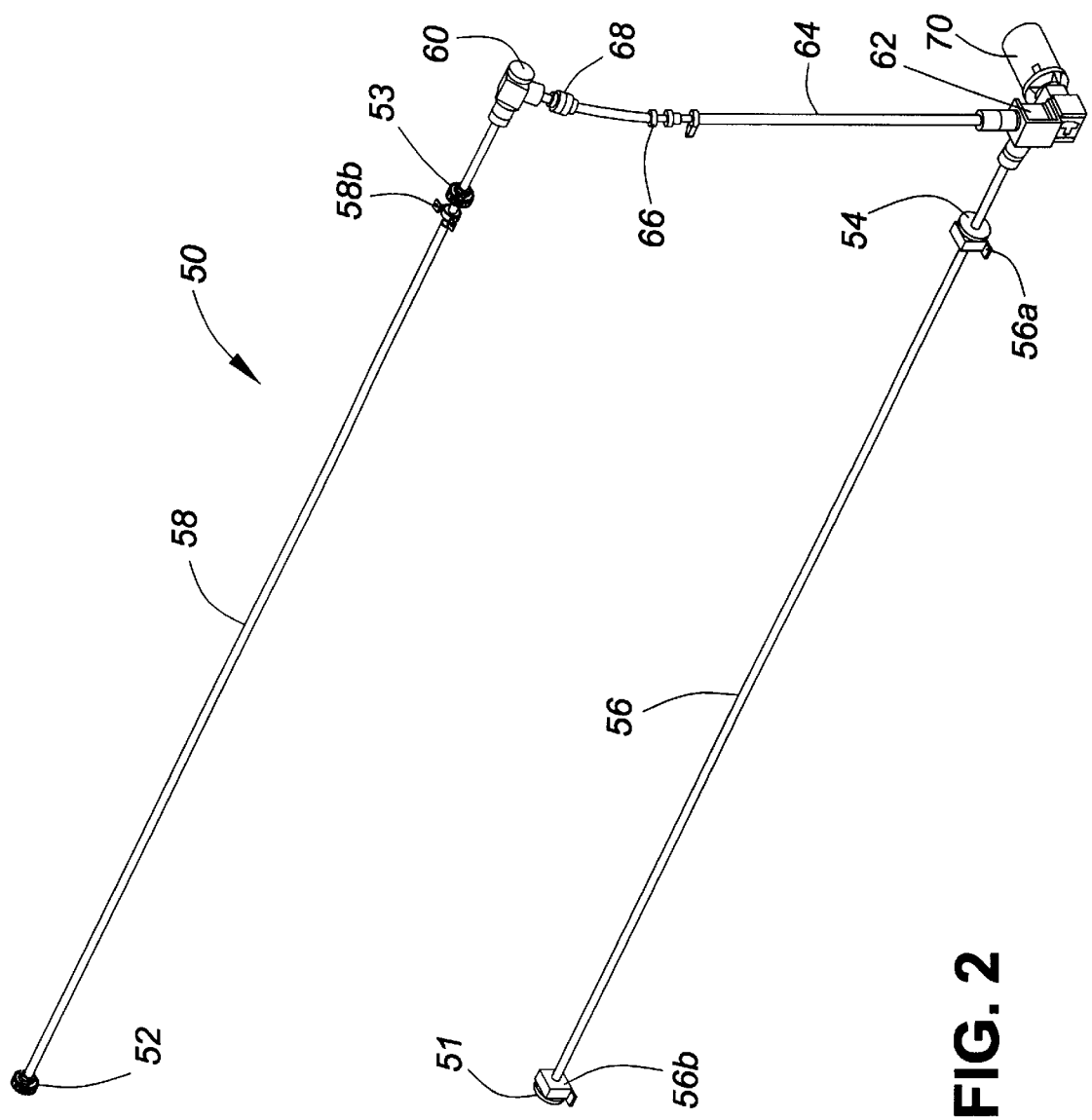
FIG. 2 is a perspective view of the pinion drive system in accordance with the invention.

With specific reference to FIG. 2, the drive system 50 includes pinion elements 51, 52, 53 and 54 located adjacent the corner elements 16a, 16b, 18a and 18b. Rack elements 16a', 16b', 18a' and 18b' are incorporated into or are operatively connected to corner elements 16a, 16b, 18a and 18b. A drive rod 56 operatively connects lower pinion element 51 with lower pinion element 54 and drive rod 58 connects upper pinion element 52 with upper pinion element 53. The upper and lower drive rods 56 and 58 are secured to the frame of the vehicle through bearing supports 56a, 56b, 58a, and 58b respectively. Drive rod 56 synchronizes the rotation of pinion elements 51 and 54 with respect to one another and drive rod 58 synchronizes the rotation of pinion elements 52 and 53 with respect to one another.

In addition, the drive system 50 includes gear-box elements 60 and 62 operatively connected to the drive rods 58 and 56 respectively to synchronize the rotation of the upper and lower drive rods 56 and 58. Connection of the gear boxes 60 and 62 is achieved through vertical drive rod 64. Preferably, in order to permit offsetting of gear box 60 with respect to gear box 62, flexible or universal couplings 66, 68 may be provided. Operation of the device is achieved through electric motor 70 operatively connected to one gear box.

Figure 3:
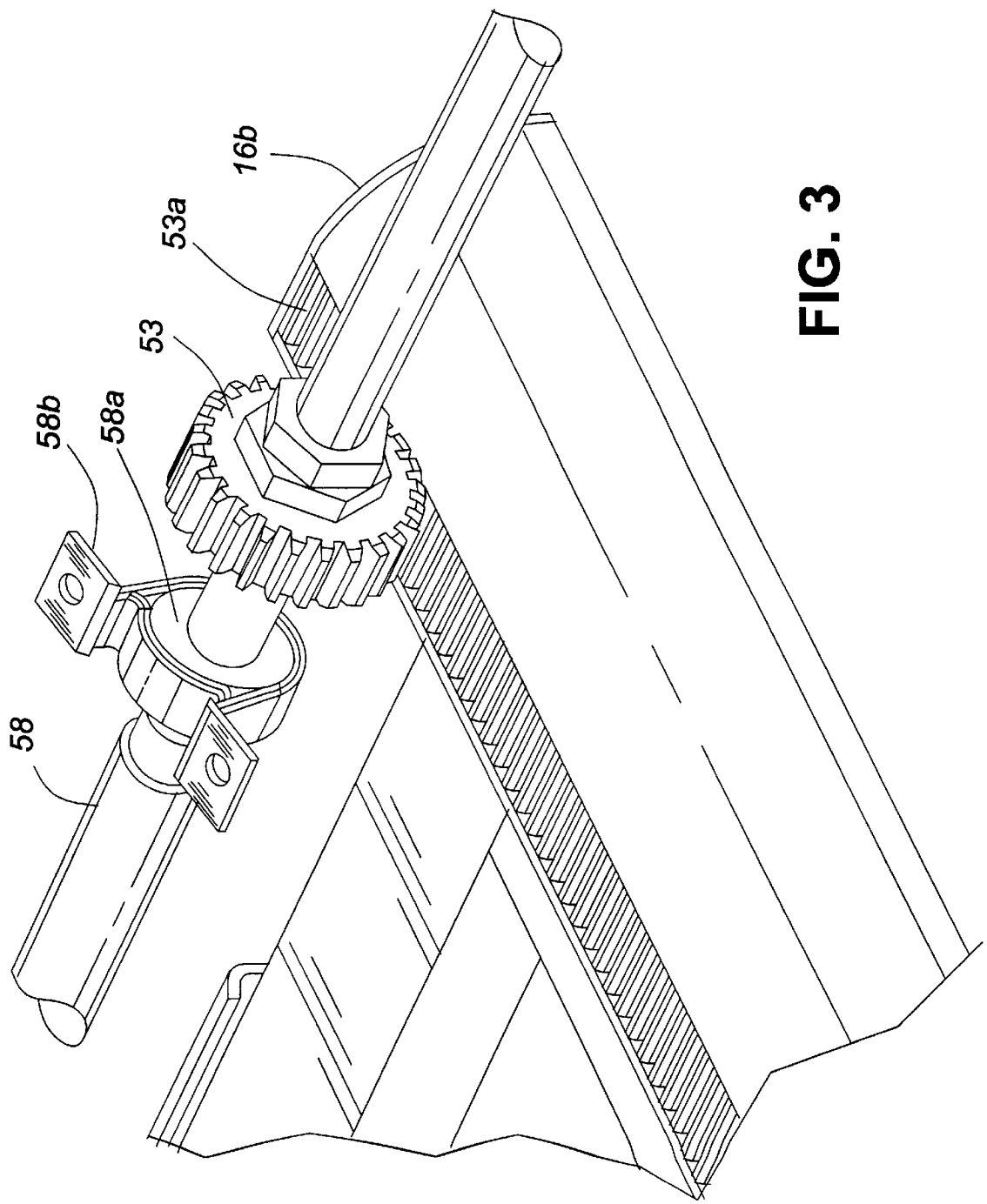
FIG. 3 is an enlarged perspective view of the upper rack and pinion of the drive system in accordance with the invention; and, FIG. 4 is an enlarged perspective view of the lower rack and pinion of the drive system in accordance with the invention.
Figure 4:
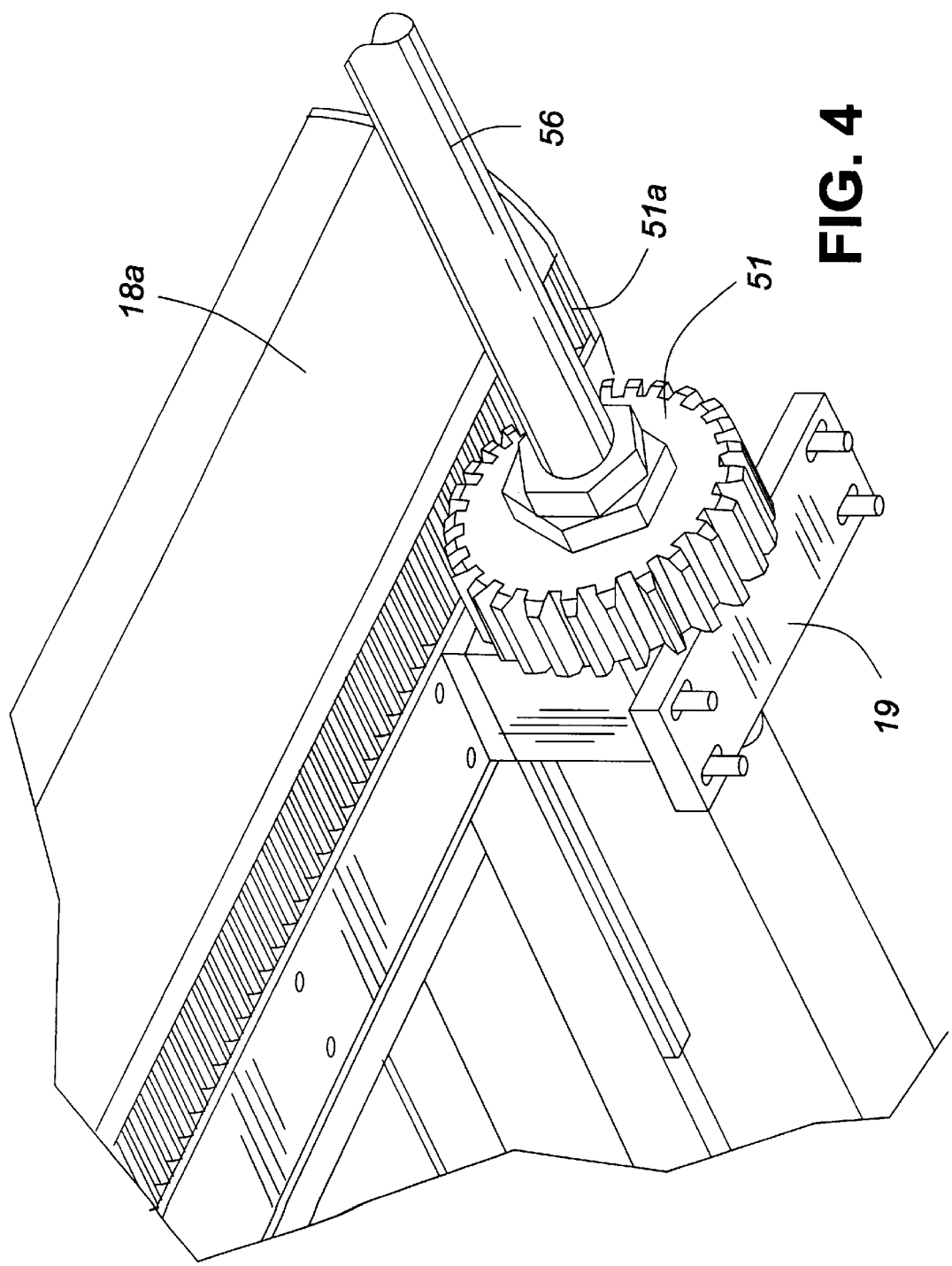

With reference to FIGS. 3 and 4, details of the upper and lower rack and pinion systems located at each corner are shown. With specific reference to FIG. 3, pinion 53 is shown engaged with rack 53a located on corner member 16b. Support bearing 58a is shown engaged with drive rod 58 with flanges 58b for attachment to the main body of the vehicle (not shown). Flanges 58b and 58c (FIG. 2) are secured to the main vehicle body so as to prevent travel of pinions 52 and 53 with respect to one another.

With specific reference to FIG. 4, pinion 51 is shown operatively engaged with rack 51 a on corner member 18a. Pinion 51 and drive rod 56 are supported by bearing block 19 which is fixedly attached to the main vehicle body (not shown). Accordingly, as can be seen from FIGS. 1 and 4, pinions 51 and 54 and drive rod 56 support the extendable room structure within the vehicle.

In operation, actuation motor 70 provides rotational input into gear box 62. Gear box 62 drives gear box 60, and together they simultaneously drive rods 56 and 58 through their respective couplings. The output of gear boxes 60 and 62 are equal with respect to one another. In order to ensure that linear travel of the upper and lower drive systems is synchronized, appropriate mechanical gearing within gear boxes 60 and 62 is provided. In addition, an appropriate gearing ration may be provided to ensure electromechanical efficiency between the motor 70 and the output of gear box 62.

In addition, appropriate electrical control of the actuation motor 70 may be provided to automate the extension or retraction of the extendable room. Such control may include appropriately mounted sensors on the extendable room and vehicle body which deactivate the actuation motor 70 at specific linear positions of the extendable room with respect to the vehicle body.

It is understood that various modifications may be made to the system without departing from the spirit and scope of the invention.

What is claimed is:

1. A drive system for use in extending and retracting an extendable room on a vehicle frame, the drive system comprising first and second pairs of parallel rack and pinion systems operatively connected between the vehicle frame and the extendable room, each pair of parallel rack and pinion systems synchronized through respective drive rods and operable between a closed position where the extendable room is retracted with respect to the vehicle frame and an open position where the extendable room is extended with respect to the vehicle frame, wherein each pair of rack and pinion systems is operatively connected to one another through a second drive rod.

2. The drive system of claim 1 wherein the extendable room has top and bottom corners, wherein each pair of the rack and pinion systems are operatively attached adjacent the top or bottom corners of the extendable room.

3. The drive system of claim 2 wherein each respective drive rod is secured to the extendable room by a drive rod support.

4. The drive system of claim 3 wherein the second drive rod is operatively connected to the first and second parallel pairs through first and second gear boxes to provide synchronous actuation of the first and second parallel pairs of rack and pinion systems.

5. The drive system of claim 1 wherein the second drive rod is operatively connected to the first and second parallel pairs through first and second gear boxes to provide synchronous actuation of the first and second parallel pairs of rack and pinion systems.

6. The drive system of claim 5 wherein a motor is operatively connected to one of the gear boxes for synchronous actuation of the first and second parallel pairs of rack and pinion systems.

7. The drive system of claim 1 wherein each respective drive rod is secured to the extendable room by a drive rod support.

8. The drive system of claim 1 wherein the second drive rod includes at least two sections joined by one or more flexible couplings.

* * * * *